H. B. WYCKOFF.
CORN HARVESTER.
APPLICATION FILED SEPT. 19, 1912.

1,203,954.

Patented Nov. 7, 1916.
5 SHEETS—SHEET 1.

Witnesses:
John Enders
J. V. Curran.

Inventor:
Herbert B. Wyckoff,
by Wallace R. Lane.
Atty.

H. B. WYCKOFF.
CORN HARVESTER.
APPLICATION FILED SEPT. 19, 1912.

1,203,954.

Patented Nov. 7, 1916.
5 SHEETS—SHEET 2.

Witnesses:
John Enders
J. V. Curran.

Inventor:
Herbert B. Wyckoff,
by Wallace R. Lane.
Atty.

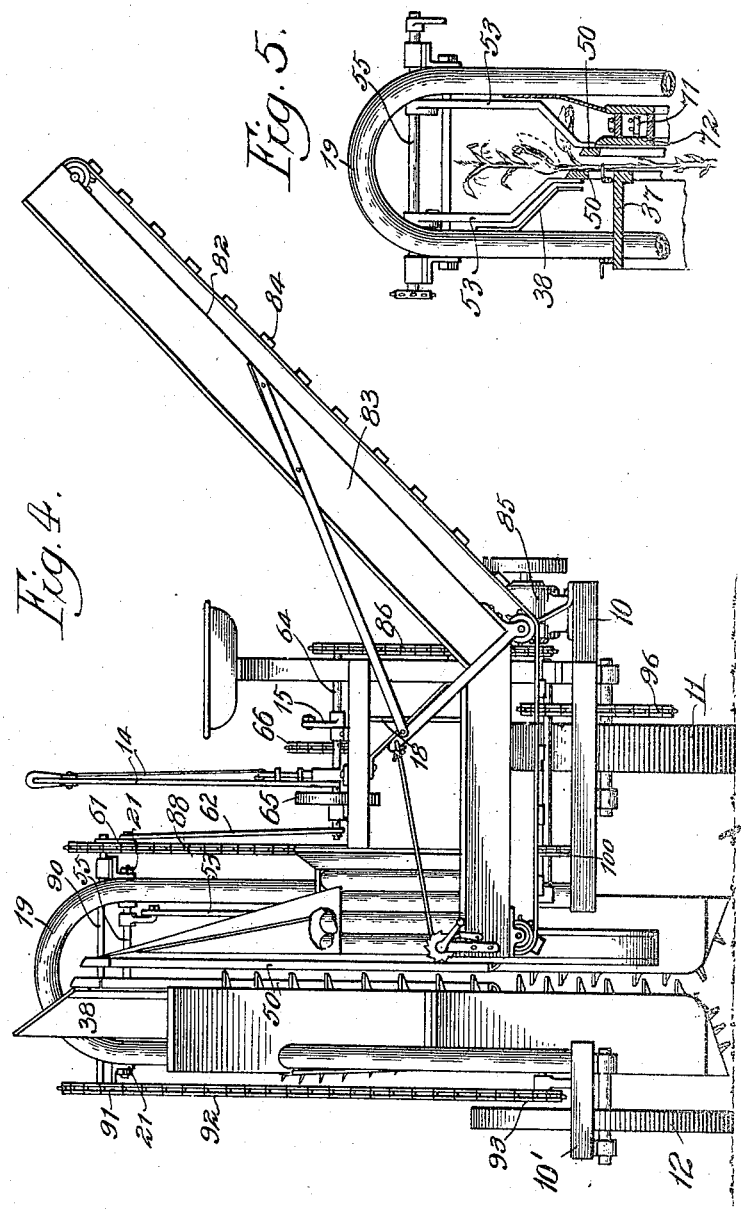

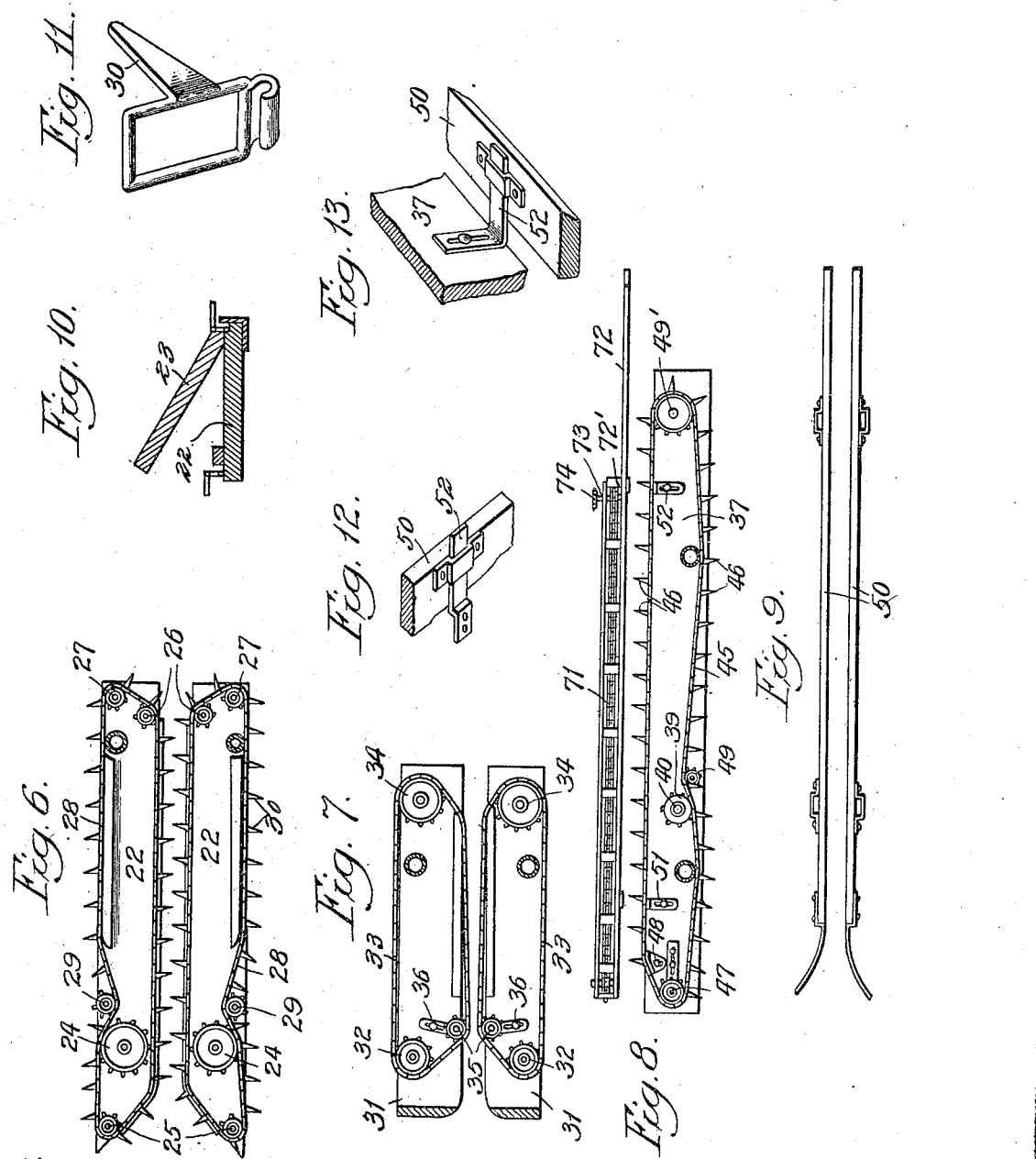

UNITED STATES PATENT OFFICE.

HERBERT B. WYCKOFF, OF CENTERVILLE, IOWA.

CORN-HARVESTER.

1,203,954.　　　　　Specification of Letters Patent.　　Patented Nov. 7, 1916.

Application filed September 19, 1912. Serial No. 721,193.

*To all whom it may concern:*

Be it known that I, HERBERT B. WYCKOFF, a citizen of the United States, residing at Centerville, in the county of Appanoose and State of Iowa, have invented new and useful Improvements in Corn-Harvesters, of which the following is a specification.

My present invention is a machine for harvesting corn by snapping the ears from the stalks standing in the field and then husking the ears and delivering them to a wagon driven along at the side of the harvester.

One object of my invention is to provide a machine which can be operated on soft ground or in "down" corn and which will pick up the stalks and hold them while stripping the ears, without pulling the stalk out by the roots.

A further object is to provide suitable motive power for the harvester and more particularly to provide a motor mounted on the harvester frame and connected, as through a clutch, so that it can be thrown in gear to drive the conveyers, the snapping bars and other moving elements of the harvester. A harvester thus equipped with a motor can be used on soft ground even when the corn is heavy and badly lodged, with good efficiency and with reasonable certainty that all the ears can be stripped from the stalks without clogging the harvester and without pulling the corn up by its roots.

Other objects of my invention and details of the arrangement and correlation of the various parts, whereby the several objects are attained, are made apparent by the following detailed description which is to be taken in conjunction with the accompanying drawings in which—

Figure 1:
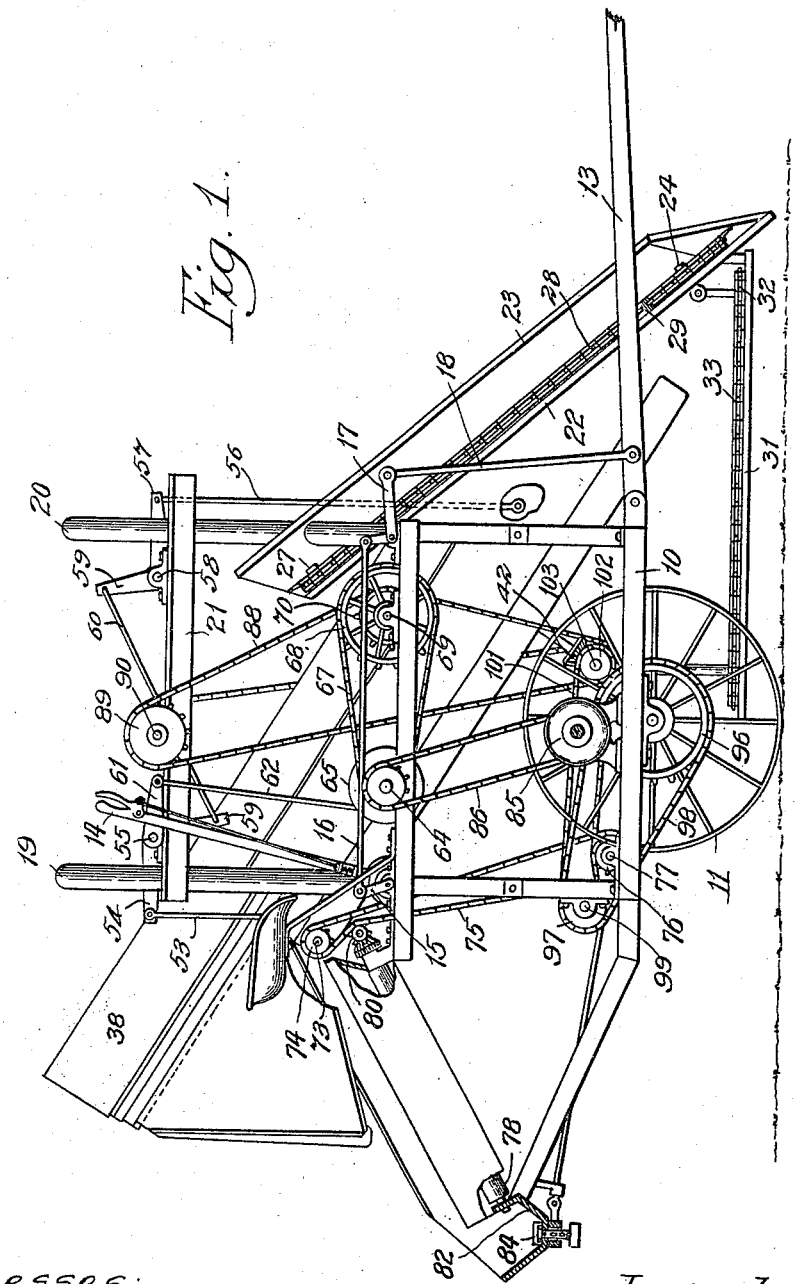
Figure 2:
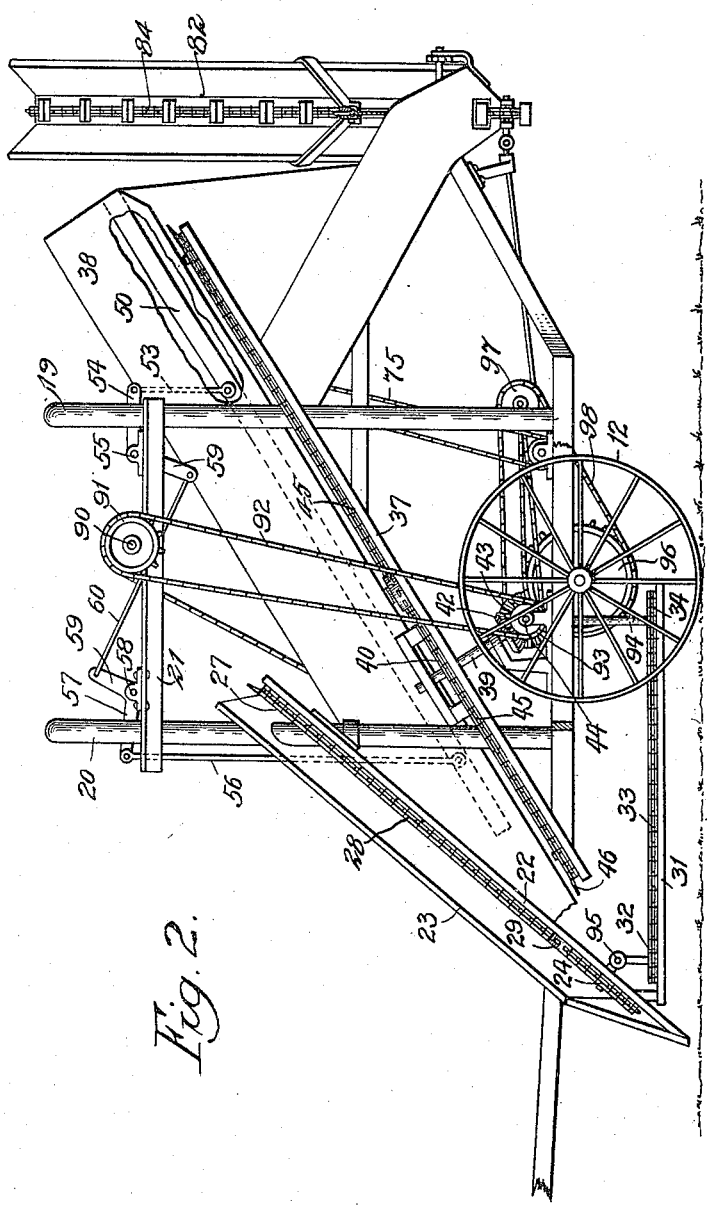
Figure 3:
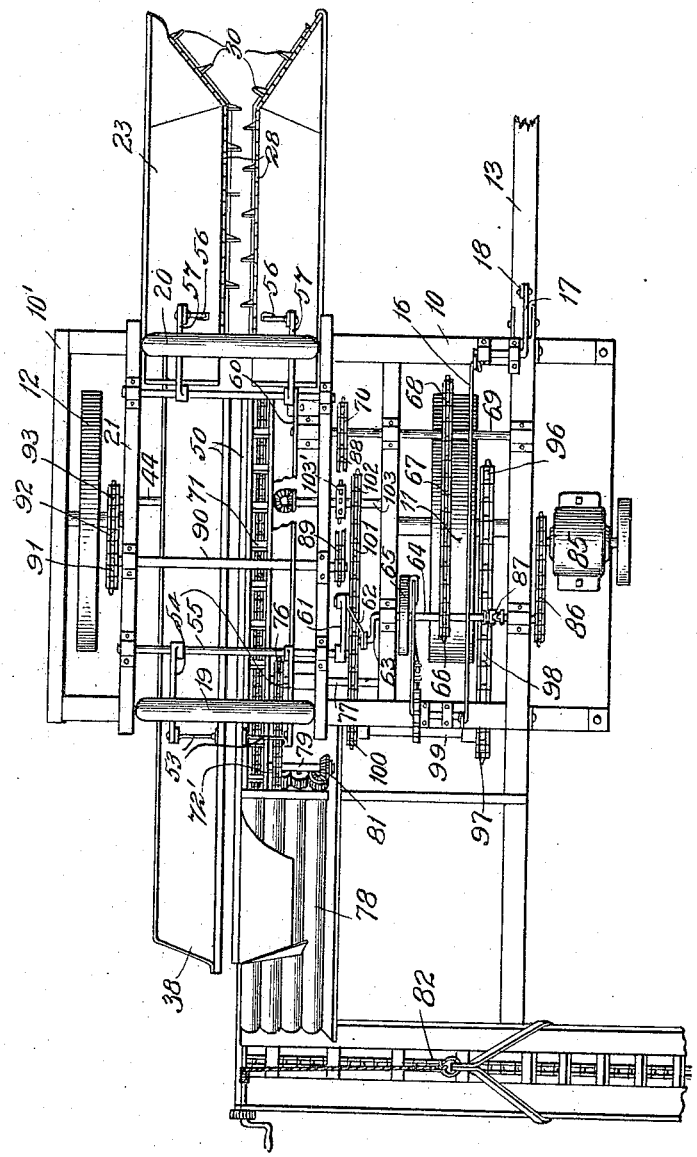

Figure 1 is a side elevation of a complete harvester. Fig. 2 shows the opposite side of the harvester. Fig. 3 is a plan view of the same. Fig. 4 is a rear view of the harvester. Fig. 5 is a detail showing the action of the snapping bars. Fig. 6 is a detail plan view showing the upper conveyer for gathering the stalks and guiding them to an upright position between the snapping bars. Fig. 7 is a detailed plan view of the lower or guiding conveyer showing the means for separating the stalks so that they will enter between the snapping bars, one at a time. Fig. 8 is a plan view of the conveyer used for delivering the severed ears to the husking rollers. Fig. 9 is a plan view of the snapping bars. Fig. 10 is a sectional view of one of the frames of the upper stalk gathering and guiding device, this figure showing one of the chains in section, provided with outwardly extending arms. Fig. 11 is a perspective view of one of the links of the stalk conveyer chains provided with a laterally projecting arm. Fig. 12 is a perspective view showing one of the guides used in connection with the snapping bars, and Fig. 13 is a perspective view of the guiding and adjusting device whereby the snapping bars may be moved toward or from one another.

The main frame 10 of the harvester is mainly supported on a traction wheel 11 used for furnishing power to operate some of the machine elements of the harvester. A second or supporting wheel 12 is arranged under a supplemental frame 10' of the harvester and is in alinement with the traction wheel 11. At the forward end of the frame is a pivotally mounted tongue 13 to which horses used for drawing the harvester, may be attached. By virtue of the pivotal connection between the tongue 13 and the frame 10 and through the agency of a hand lever 14, a crank arm 15, a rod 16, a bell crank 17, and a link 18, suitable angular relation between the tongue and the frame can at all times be attained, for by manipulating the lever 14 the forward end of the machine frame may be tilted upward or downward as desired.

The main frame 10 and supplemental frame 10' are connected together by arched tubes 19 and 20 which extend upwardly high enough to clear the tops of the corn stalks. These tubes are connected together at their sides by suitable side rails 21, which also serve to support some of the operative parts of the machine.

When the machine is being hauled through the corn, particularly if the corn is heavy or is somewhat lodged or "down," it is necessary to pick up the "down" stalks and guide all the stalks into position between the snapping bars. This stalk gathering and guiding device comprises two frames arranged one on each side of the row of corn to be harvested and each comprising a flat bottom member 22 and a guard plate 23 fixed at its inner edge to the bottom member and inclined upwardly and outwardly, as shown in Fig. 10.

The angular frame thus formed is fixed at its rear end to the tubular arch 20 and is inclined downwardly and forwardly to a point close to the ground. Mounted near the forward end of each bottom member 22 and under cover of the guard plate 23 is a driving sprocket wheel 24 driven, as hereinafter set forth. The forward end of each bottom plate 22 is cut away at the front for the more ready reception of the corn stalks and at the outer corner of each bottom member is an idler sprocket wheel 25. Other idlers 26 and 27 are located at the rear end of the frame and a sprocket chain 28 is passed around said sprocket and idlers and is held in operative engagement with the driving sprocket 24 by means of a chain tightening sprocket 29. Some of the links of this chain are provided with outwardly projecting arms 30 as shown in Fig. 11. These arms are designed to engage the stalks and hold them in upright position while the stalks are being passed to the snapping bars.

Positioned below the inclined gathering and guiding device just disclosed are two base plates 31, one on each side of the opening through which the corn stalks pass, both of these base plates extending from a point slightly below and in the rear of the forward end of the upper gathering and guiding device backward substantially parallel to the ground for some considerable distance. Each base plate 31 carries at its front end a sprocket wheel 32 over which passes a sprocket chain 33 driven from a sprocket 34 and held taut by an idler sprocket 35 carried by an adjustable holder 36. If it is desired to adjust the machine for small stalks, these idlers are movable relatively close together but in any event they are so spaced as to admit only one corn stalk at a time and because of this separation of the stalks, the ears are more readily removed. The horizontal guiding means 31 and their sprocket chains serves not so much for picking up the corn as for guiding and holding it while the ears are being snapped, thus preventing the stalks from being torn up by the roots either through the pulling action of the gathering device at the front of the machine or through the lifting action of the snapping bars used to remove the ears from the stalks.

Another inclined guiding and pick up device comprises two independent members positioned above the horizontal base plates 31 and below the main gathering and guiding frames 22. These are located one on each side of the corn stalk opening and as they differ in construction, they will be separately described. The member on the left of the machine comprises a base plate 37, extended from a point slightly below and in the rear of the forward end of the upper gathering and guiding device and projects upwardly and rearwardly at a less degree of inclination than the upper gathering and guiding device and extends to a point near the rear of the machine frame. A shield 38 is supported on the machine frame and extends from a point above the inner edge of the plate 37, first straight upwardly, then upwardly and to the left to prevent ears or stalks of corn from bending over and engaging the top of the plate 37. Near the center of the plate 37 is an upright shaft 39 extended through the plate and provided at its upper end with a sprocket wheel 40. This shaft is driven by means of a bevel gear wheel 42 on its lower end in mesh with the beveled gear wheel 43 on a shaft 44, which shaft is driven as hereinafter disclosed.

A sprocket chain 45 mounted above the base plate 37 is provided with laterally projecting arms 46 for engagement with the corn stalks. An adjustable idler 47 together with an adjustable guide plate 48 and idlers 49 and 49′ hold the chain in proper position for engagement with the stalks. This chain is for the purpose of engaging corn stalks and holding them in upright position while they pass through the machine.

The snapping device comprises a pair of bars 50 arranged one on each side of the stalk opening, these bars having their top edges beveled in same directions, with one bar somewhat higher than the other. Both are arranged on suitable supports 51 and 52 carried by the base 37 so that they are permitted to move only in a vertical direction, though perferably the bars are adjustable toward one another to decrease the width of the stalk opening as shown in Fig. 13. Provision is made for reciprocating these snapping bars vertically during the operation of the machine through the action of two hangers 53 which extend upwardly and are attached to crank arms 54 on the rock shaft 55. The forward ends of the snapping bars are connected to hangers 56, which extend upwardly and are pivoted to the arms 57 on the rock shaft 58. These two rock shafts are connected to work in unison by two crank arms 59 connected by a link 60. A rocking movement imparted to the rear rock shaft 55 will simultaneously move both of the snapping bars up and down.

At the right end of the shaft 55 is a crank arm 61 connected to a pitman 62, which latter is pivoted to the crank arm 63 of a shaft 64 mounted in the machine frame. On this shaft is a balance wheel 65 and a sprocket wheel 66, the latter being connected by a chain 67 with a sprocket wheel 68 on a shaft 69, also mounted in the frame in front of the shaft 64. Said shaft 69 is also provided with a sprocket 70, which is arranged for driving a suitable sprocket chain. The size of the sprocket wheels 68 and 66 is such that the speed of the shaft 64 is increased relative to that of the shaft 69. Obviously by this arrangement, the snapping bars will be rapidly reciprocated in straight vertical movement. The hangers 56 and 53 are spaced apart a considerable distance at their upper ends and are inclined downwardly and then inwardly where they connect to the snapping bars, the advantage of this being that the said arms will not interfere with the tops or ears of corn that pass through between the snapping bars and they may incline to one side or the other. The advantage of having the upper edges of the snapping bars arranged one above the other and beveled as shown, is that when the upper bar first engages an ear of corn, it will engage the ear in a manner tending to bend it over so that it overlaps the lower snapping bar and then when the lower snapping bar strikes the stem of the ear, it will do so with its sharp corner and thus snap the ear from the stem readily and easily and without too much tendency to tear the stalk up by the roots.

A conveyer chute 71 is arranged adjacent to the side of the lower snapping bar and just in the rear of a frame member or board 72 forming one side of the stalk opening, the chain of the conveyer being driven from a sprocket wheel 72' carried on shaft 73 and provided with a driving sprocket 74. This sprocket 74 is driven by means of a chain 75 which passes around a sprocket wheel 76 on the shaft 77, this shaft 77 being driven by the chain 101.

The husking rollers 78 are arranged at the delivery end of the conveyer 71 and are driven by means of a shaft 79 having a sprocket 80 in engagement with the chain 75, these rollers 78 and the shaft 79 both being provided with beveled gears 81 of the ordinary kind.

At the rear of the husking rollers is a conveyer chute 82 having an extension 83 suitably adjustable and having a conveyer chain 84 driven by power from the shaft 77 by a flexible shaft connection.

Mounted on the side of the frame 10 is a motive device 85, such as a gasolene engine, connected up through a sprocket chain 86 and a suitable clutch 87 to the transverse shaft 64. It is through this shaft that the snapping bars are actuated.

As previously stated shaft 64 carries a sprocket wheel 66 meshing with a chain 67 which passes over a sprocket 68 on shaft 69. On this shaft 69 is a second sprocket wheel 70 engaging with a long chain 88 which extends up over a sprocket 89 on the transverse shaft 90. At the opposite end of shaft 90 is a sprocket 91 and chain 92 the latter being used to drive a sprocket 93 on the shaft 44. This shaft through its beveled gear 43 meshing with the bevel gear 42 on shaft 39 is utilized for driving the inclined conveyer 45. The other conveyers on that side of the machine are driven from shaft 44 through bevel gears 93 and a vertical drive shaft 94 on which sprocket 34 is mounted. Above sprocket 32 is a shaft having a universal joint 95 for delivering power to sprocket 24 of the stalk gathering conveyer. Similar driving connections are provided for the horizontal and the stalk gathering conveyers on the other side of the machine. There is, however, another way of delivering power to these various operative parts of the harvester which will here be described. On the traction wheel axle is a sprocket wheel 96 connected with a sprocket wheel 97 in the rear by means of a sprocket chain 98. This sprocket wheel 97 is fixed to a shaft 99, and another sprocket wheel 100 is fixed to the same shaft and connected by a chain 101 with a sprocket wheel 102 which latter sprocket wheel is fixed to the shaft 103, carrying a sprocket wheel 103'. It is over this sprocket wheel 103' that the long drive chain 88 is passed to transmit energy to or from shaft 69.

When the harvester is to be used, the engine is started with the driving clutch open and the horses are started to advance the harvester through the field. Then the clutch of the engine is thrown in and the engine is relied on to deliver approximately the proper amount of power for driving the various conveyers and sprocket chains of the machine and also for actuating the snapping bars, but the amount of energy may be somewhat above or somewhat below the amount necessary for this work, without interfering with the normal operation of the harvester as thus driven. The horses merely pull the machine through the field and are not called upon to supply the energy necessary for operating the movable parts of the harvester.

By thus having the harvester equipped with a self-contained motive device, the machine is made available for use on soft ground, where, if not so equipped, the traction wheel would slip and clog.

In general the draft animals will be relied upon to haul the harvester over the ground, for the slippery and soft condition of a wet field, precludes the possibility of effectively advancing the harvester through the field under its own power.

When the harvester is being advanced over a field the gathering and guiding devices at the front of the machine pick up the stalks and hold them in upright position while at the same time the chains located parallel with the ground separate the stalks so that they enter the machine one at a time and simultaneously prevent the corn from being up-rooted and carried upward along the incline of the gathering device. By having the upper gathering and guiding devices arranged at a greater angle than the lower ones, there is a tendency to straighten out the tops of stalks that may be broken or bent over. The snapping bars strike the stems of the ears as shown in Fig. 5, and drop the ears into the inclined conveyer whereby they are carried to the husking rollers and ultimately dropped on the delivery conveyer whereby they are lifted up and loaded into a wagon driven along at the side of the machine.

I claim:

1. In a corn harvester, the combination of a wheeled carrying frame, a supporting frame suspended therefrom, an upwardly inclined stalk gathering device comprising a pair of endless conveyers mounted on said frame, an upwardly inclined guiding device comprising an endless conveyer mounted on said frame below the gathering device, a snapping device for removing the corn from the stalks, means for holding the stalks against upward movement while the ears are being snapped, said means comprising a pair of opposed endless flexible members, mounted in a horizontal plane adjacent to the ground on said supportnig frame, adapted to frictionally engage said stalks near the lower end thereof and means for operating said parts.

2. In a corn harvester, the combination of a wheeled carrying frame, a stalk gathering device mounted on said frame, means for snapping the ears of corn from the stalks, means for holding the stalks against upward movement while the ears are being snapped, said means comprising a pair of flexible conveyers mounted in a horizontal position near the lower portion of said frame and adapted to frictionally engage said stalks near the lower end thereof and means for operating said parts.

3. In a corn harvester, the combination of a wheeled carrying frame, a stalk gathering device mounted on said frame, means for snapping the ears of corn from the stalks, means for holding the stalks against upward movement while the ears are being snapped, said means comprising a pair of flexible conveyers mounted in a horizontal position near the lower portion of said frame and adapted to frictionally engage said stalks near the lower end thereof, means for operatively connecting the snapping device and holding device and means carried by the frame whereby said parts may be jointly operated.

4. In a corn harvester, the combination of a carrying frame, an upwardly inclined stalk gathering device mounted near the forward end of said frame, means mounted on said frame for snapping the ears of corn from the stalks, means for holding said stalks from upward movement while the ears are being snapped, said means comprising a pair of endless conveyers arranged in a horizontal position and adapted to travel over sprocket wheels supported from said frame and gathering device and means for operatively connecting said parts to a suitable power mechanism carried by said frame.

5. In a corn harvester, means for snapping the ears of corn from the stalks and means for holding the stalks against upward movement while the ears are being snapped said means comprising a pair of engaging members mounted in a horizontal position near the lower portion of the harvester and adapted to frictionally engage the stalks near the lower end thereof.

6. In a corn harvester, the combination of a wheel carrying frame, means for snapping the ears of corn from the stalks, and means for holding the stalks against upward movement while the ears are being snapped, said means being adapted to frictionally engage the stalks near the lower ends thereof.

In witness whereof, I hereunto subscribe my name to this specification in the presence of two witnesses.

HERBERT B. WYCKOFF.

Witnesses:
C. A. LESENEY,
IMMER FOWLER.

Copies of this patent may be obtained for five cents each, by addressing the "Commissioner of Patents, Washington, D. C."